G. E. STANLEY.
CHANGE SPEED GEAR.
APPLICATION FILED SEPT. 28, 1917.

1,274,463.

Patented Aug. 6, 1918.
2 SHEETS—SHEET 1.

Inventor
George Enoch Stanley

Inventor,
George Enoch Stanley

UNITED STATES PATENT OFFICE.

GEORGE ENOCH STANLEY, OF COVENTRY, ENGLAND.

CHANGE-SPEED GEAR.

1,274,463.

Specification of Letters Patent.

Patented Aug. 6, 1918.

Application filed September 28, 1917. Serial No. 193,711.

*To all whom it may concern:*

Be it known that I, GEORGE ENOCH STANLEY, a subject of the King of England, residing in Coventry, Warwickshire, England, have invented certain new and useful Improvements in Change - Speed Gears, of which the following is a specification.

This invention relates to improvements in change speed gears for motor vehicles, of the kind in which parallel driving and lay shafts are employed, and a driven shaft is disposed concentrically with the driving shaft and geared permanently to the lay shaft; sliding gear wheels being provided on one of the shafts to coöperate with wheels on the other shaft. In such a construction the sliding member comprises one or more toothed wheels of different sizes having attached at the sides one or more clutch-parts whereof one clutch-part effects a direct drive when the member is at one end of its travel, a toothed wheel on the sliding member provides another speed when the member is moved one step back along its travel, and the other clutch-part or a second wheel on the member effects an engagement for a third speed when the member is moved another step back.

According to this invention, the sliding member has dogs at each side to clutch it to the shaft, which dogs engage with splines on the shaft after the sliding toothed wheel is meshed with its appropriate toothed wheel on the lay shaft. Other features of this invention will be evident from the following description taken in conjunction with the accompanying drawings, in which:—

Figure 1:
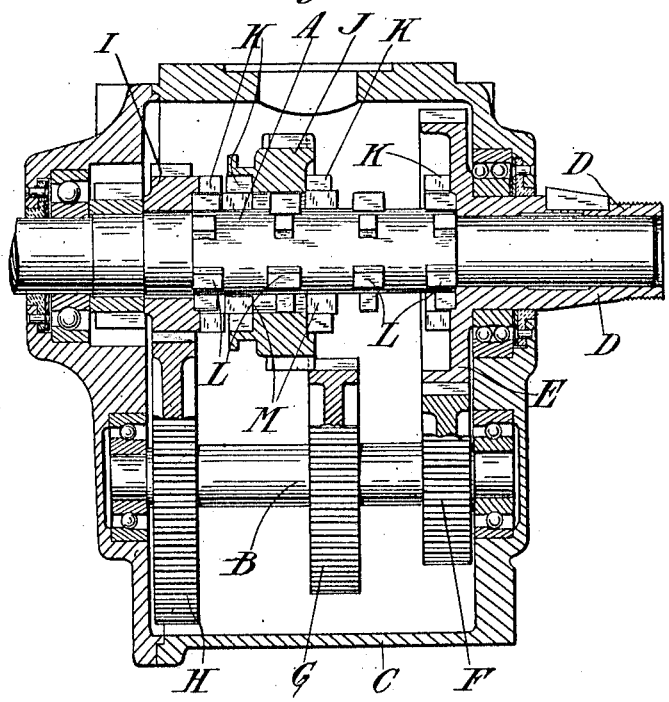
Figure 1 is a vertical longitudinal section through a change speed gear according to this invention.

Referring to Fig. 1, a driving shaft A and a lay shaft B are mounted in a gear box C. A driven sleeve D is loosely mounted on the driving shaft A and carries a toothed wheel E permanently meshed with a wheel F which is the smallest of three wheels F, G, and H rigidly mounted on the lay shaft B. A wheel I is loosely mounted on the driving shaft A and is permanently meshed with the wheel H on the lay shaft. A sliding wheel J is adapted to be moved along the shaft by a forked rod of the usual construction, so as (1) to clutch the wheel E to the shaft for direct drive, or (2) to mesh the wheel J with wheel G for the second speed, or (3) to clutch the wheel I to the shaft for the low speed. The clutch parts are arranged as follows:—On each of the wheels I, J and E dogs K are provided for coupling the sliding wheel J to either I or E. Splines L are provided on the shaft, and dogs M on the sliding wheel can engage the splines in any one of the three speed positions. In order to facilitate the engagement of splines L and dogs M, each ring of splines is composed of alternately long and short elements, and the dogs are similarly arranged, so that when moving into engagement, first the longer projecting splines engage the longer projecting dogs and then the shorter splines and dogs engage.

To facilitate gear changing, either from second speed to low or from second speed to high, the parts are so dimensioned that should the long dogs M abut end-on against the splines L the wheel J will still have a slight engagement with the wheel G so that it will be revolved at a different speed to the driving shaft, and the long dogs and splines will slip out of end-on contact and will engage properly. The wheel J will then have moved out of engagement with the wheel G, and the wheel J will be running at the same speed as the driving shaft, and as the gear wheel to be engaged (the gear wheel I in Fig. 1) is connected with the driven member of the gear box it is almost certain to be revolving at a different speed so that full engagement of the dogs M with the splines L and the engagement of the gear wheel dogs K is easily effected. Similarly, in changing from low or high into second speed the wheel J is first engaged with the wheel G. If the dogs then come end-on the different rates of revolution of the driving shaft and of the sliding element will cause the dogs to slide out of end-on contact, when they will immediately engage properly.

Figure 2:
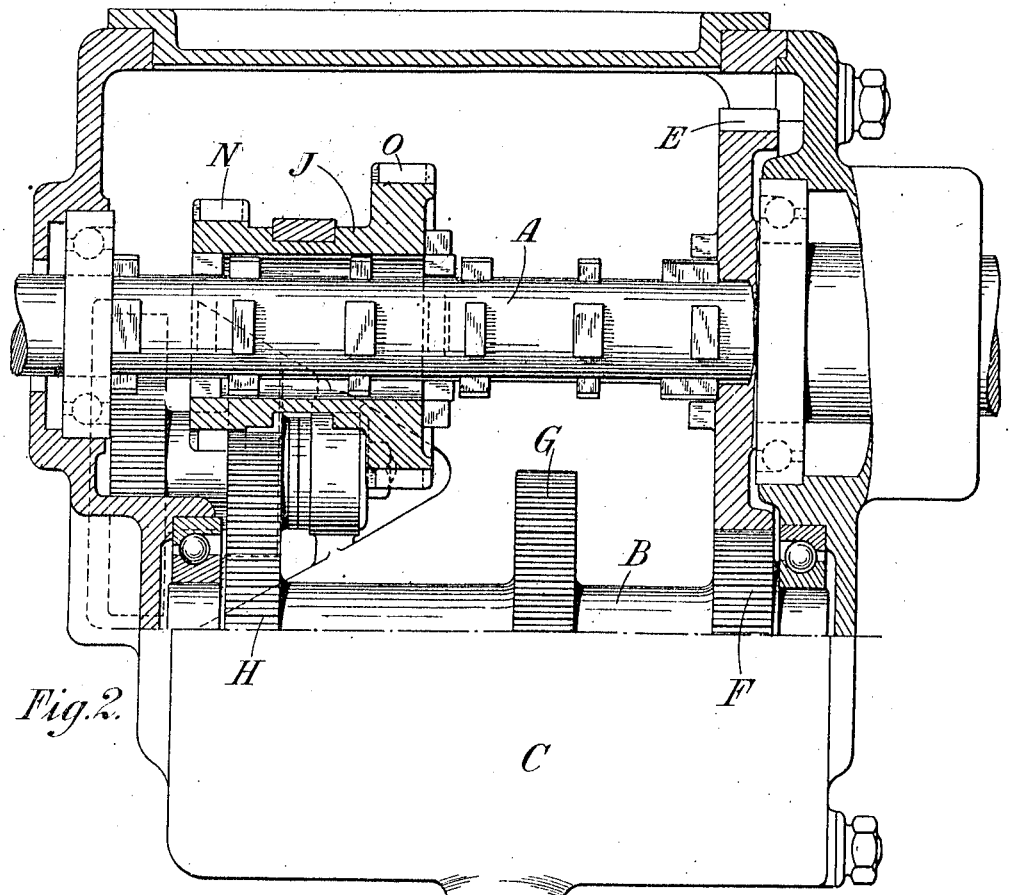
Fig. 2 is a similar section through a modified construction.
Figure 3:
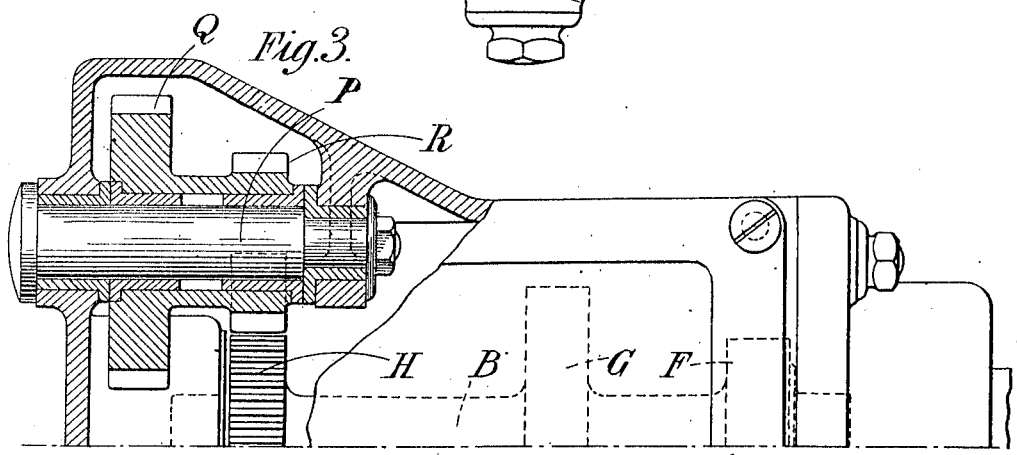
Fig. 3 is a horizontal longitudinal section showing a reverse gear.

Referring to Figs. 2 and 3, A is the driving shaft and B is the lay shaft mounted in a gear box C. The construction differs from that shown in Fig. 1 in that the sliding member J carries two toothed wheels N and O instead of only one toothed wheel, and there is no toothed wheel I permanently meshed with the lay shaft. For the low speed the sliding member J is moved endwise until the toothed wheel N meshes with the lay shaft wheel H and the dogs on the sliding member engage appropriate splines on the driving shaft. For the second speed the sliding member is moved until the toothed wheel O meshes with the lay shaft wheel G and the dogs on the sliding member engage the two rings of splines intermediate the ends of the driving shaft. For direct drive the sliding member is moved into engagement with the toothed wheel E as described in connection with Fig. 1. Gear changing is facilitated in the construction shown in Fig. 2, in the same manner as set forth in connection with Fig. 1. That is to say when changing from second speed to high the sliding member engages splines on the driving shaft before leaving the middle wheel on the lay shaft; and when moving into second speed, wheel O meshes with the middle wheel on the lay shaft before the sliding member leaves the splines adjacent the wheel E.

The number of gears can, of course, be varied according to the number of various speeds desired.

A reverse shaft P is provided with two toothed wheels Q, R, the smaller of which, R, is permanently meshed with the toothed wheel H of the lay shaft. In order to put in the reverse drive, the sliding member J is moved endwise until the toothed wheel N engages Q on the reverse shaft and also the dogs on the sliding member engage splines on the driving shaft. The arrangement illustrated gives a lower gear for reverse than for forward low speed.

In order to facilitate the meshing of the toothed wheels, the teeth may be staggered. That is to say, alternate teeth are set in two rows so that each tooth lies between a pair to the right or left of it.

What I claim as my invention and desire to secure by Letters Patent is:—

1. In a change speed gear for motor vehicles the combination of a driving shaft; a lay shaft parallel thereto; a driven shaft axially alined with the driving shaft and geared permanently to the lay shaft; gear wheels carried on a sliding member on the driving shaft and adapted to gear with a wheel on the lay shaft; dogs on each side of the sliding member; and splines on the driving shaft to engage said dogs and spaced longitudinally so as to engage the dogs after the sliding member toothed wheel is meshed with a toothed wheel on the lay shaft.

2. In a change speed gear for motor vehicles, the combination of a driving shaft; a lay shaft parallel thereto; a driven shaft axially alined with the driving shaft and geared permanently to the lay shaft; gear wheels carried on a sliding member on the driving shaft and adapted to gear with wheels on the lay shaft; dogs on each side of the sliding member; and splines on the driving shaft to engage said dogs and spaced longitudinally so as to engage the dogs after a toothed wheel on the sliding member is meshed with its appropriate toothed wheel on the lay shaft.

3. In a change speed gear for motor vehicles, the combination of a driving shaft; a lay shaft parallel thereto; a driven shaft axially alined with the driving shaft and geared permanently to the lay shaft; gear wheels carried on a sliding member on the driving shaft and adapted to gear with wheels on the lay shaft; alternately long and short dogs arranged in a ring on each side of the sliding member; and correspondingly long and short splines on the driving shaft to engage said dogs, which splines are spaced longitudinally so as to engage the dogs after a toothed wheel on the sliding member is meshed with its appropriate toothed wheel on the lay shaft.

4. In a change speed gear for motor vehicles, the combination of a driving shaft; a lay shaft parallel thereto; a driven shaft axially alined with the driving shaft and geared permanently to the lay shaft; gear wheels carried on a sliding member on the driving shaft and adapted to gear with wheels on the lay shaft; dogs on each side of the sliding member; and splines on the driving shaft to engage said dogs and spaced longitudinally so that when moving the sliding member out of middle speed to either high or low speed, the sliding member engages the splines on the driving shaft before leaving the middle speed wheel on the lay shaft, and similarly the said middle speed wheel meshes with the sliding member before the latter leaves the said splines when moving into middle speed.

5. In a change speed gear for motor vehicles, the combination of a driving shaft; a lay shaft parallel thereto; a driven shaft axially alined with the driving shaft and geared permanently to the lay shaft; gear wheels carried on a sliding member on the driving shaft and adapted to gear with wheels on the lay shaft; dogs on each side of the sliding member; splines on the driving shaft to engage said dogs and spaced longitudinally so as to engage the dogs after a toothed wheel on the sliding member is meshed with its appropriate toothed wheel on the lay shaft; and a reverse gear comprising a reverse shaft parallel to the driving shaft; and two toothed wheels keyed to the reverse shaft one of which is permanently meshed with the largest of the lay shaft wheels and the other is adapted to mesh with the smaller of the toothed wheels on the sliding member when the latter is moved endwise into an appropriate position.

In testimony whereof I have signed my name to this specification in the presence of two subscribing witnesses.

GEORGE ENOCH STANLEY.

Witnesses:
ALBERT BROWN,
SIDNEY JOHNSON.